United States Patent [19]
Karppo et al.

[11] 4,035,129
[45] July 12, 1977

[54] CONTINUOUS CURING DEVICE FOR LONGITUDINALLY EXTENDED PRODUCTS

[75] Inventors: Jukka Seppo Karppo, Helsinki; Matti Akseli Aaltonen, Espoo, both of Finland

[73] Assignee: Oy Nokia AB, Helsinki, Finland

[21] Appl. No.: 707,098

[22] Filed: July 20, 1976

[30] Foreign Application Priority Data

Oct. 21, 1975 Finland .................................. 752942

[51] Int. Cl.² ...................... B29H 5/24; B29H 5/28; B29H 7/14
[52] U.S. Cl. ............................. 425/445; 425/174.4
[58] Field of Search ................ 425/71, 174.4, 224, 425/445

[56] References Cited
U.S. PATENT DOCUMENTS 3,588,954   6/1971   Nakamura et al. ............. 425/174.4
3,645,656   2/1972   Stauffer et al. ..................... 425/71

*Primary Examiner*—J. Howard Flint, Jr.

[57] ABSTRACT

An apparatus for continuous curing (vulcanization) of elongated products, such as cables comprising a conductor surrounded by a mantle of a crosslinkable material. The apparatus comprises a curing tube through which the cable is passed longitudinally. The curing tube comprises a heating zone in which the cable is subjected to heating for heating the cable to curing temperature in a pressurized gas atmosphere and a subsequent cooling zone in which the cured cable is subjected to cooling. The curing tube is coupled to at least one electric currency source so that the wall of the curing tube is heated due to the electric resistance of the wall material to form within the heating zone a heated mantle uniformly surrounding the cable and radiating heat thereto.

7 Claims, 4 Drawing Figures

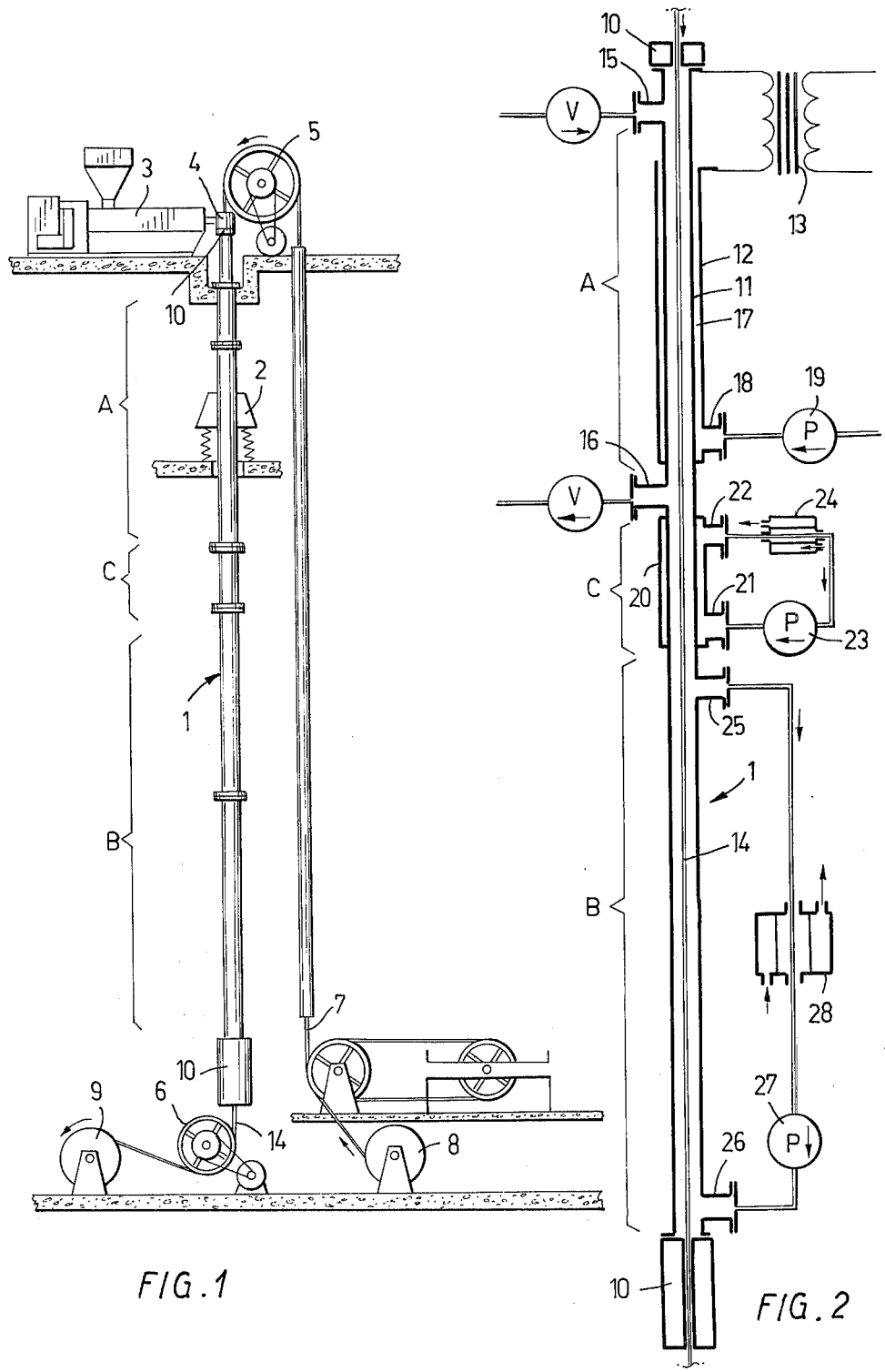

CONTINUOUS CURING DEVICE FOR LONGITUDINALLY EXTENDED PRODUCTS

The object of this invention is a device for the continuous curing or vulcanization of longitudinally extended crosslinkable products, such as cables, through which device the product undergoing crosslinking is drawn, and which comprises a heating zone, a cooling zone, the necessary equipment for heating the product in the heating zone up to the crosslinking temperature and equipment for cooling the product in the cooling zone.

It is well known that a curing tube, through which the crosslinkable product is drawn, and in which the product is subjected firstly to heating, so that the material, in the product, containing the crosslinking agent reaches a temperature at which the crosslinking reaction can take place, and then to cooling, and is finally guided out of the curing tube, can be used for the crosslinking of cables. Included in this type of crosslinkable material are, for example, high density polyethylene, low density polyethylene, ethylene propylene rubber and other synthetic and natural rubbers.

Various methods of carrying out the heating of the crosslinkable product, some of which are described in the following, have, up to now, been generally known.

The crosslinkable product can be heated by steam usually at a temperature of 180° – 210° C and a pressure of 1.0 – 2.0 MPa, in the curing tube. The curing capacity depends on the length of the tube and the temperature of the steam. Any increase in the steam temperature necessarily causes a corresponding increase in its pressure, putting additional requirements on the strength of mechanical parts. It is therefore seldom considered economical to exceed the above-mentioned values of temperature and pressure for devices in current use, and neither is increasing the tube length economically viable beyond a certain limit. Catenary-shaped tubes are generally 100 – 150 m in length and vertical tubes 40 – 70 m.

Heating of the crosslinkable product by means of infrared radiators located inside the tube is another well known method. The pressure necessary in the tube is produced by inert gas. This type of device is described in U.S. Pat. No. 3,588,954. The locating of the infrared radiators inside the tube is technically difficult and, because of their spatial requirements, the diameter of the rube must be considerably increased and its walls reinforced. The radiators have a high surface temperature and thus the surface of the crosslinkable product can easily be damaged. For this reason the method is applicable only to vertical tubes. Only a small sector is heated efficiently by the radiators. Heating of the product does not occur uniformly, as the radiators consist of separate heating elements and only a finite number of radiators can be located inside the tube. Steam, mixing with the inert gas, and the gases produced during the curing process must be removed from the tube by cycling the inert gas through a complex purifying and drying system. In addition the raw material to be crosslinked must be of a special type capable of withstanding the high surface temperature of the heaters used in the system. The cooling zone must also be extended because of the higher curing temperature.

Heating of the crosslinkable product using hot inert gas which is itself heated by a heating device located outside the curing tube is known from U.S. Pat. No. 3,645,656. The heat transfer capacity of gases is however small compared, for example, with steam, and therefore this method cannot compete in efficiency with the earlier described steam curing system.

Each of the systems described above employs water cooling. The detrimental effect of steam and water on the cured products is however well known. Water penetrates the crosslinkable material easily at high temperatures, causing a porous structure consisting of micro-voids whose diameters are in the range 1 – 20 $\mu$m. From this standpoint steam curing is clearly inferior to systems using inert gas. More micro-voids occur and their average diameters are larger than those in products cured in inert gas. Purification and drying of the inert gas outside the tube improves the quality of the product but micro-voids still occur.

The purpose of this invention is to produce a curing device which will achieve the heating of the crosslinkable products without the use of a heated gaseous or liquid medium or separate heating elements, and this is accomplished using equipment in accordance with the invention characterised in that the curing tube itself is connected to at least one voltage supply and that the walls of the curing tube function as an electrical resistance in order to heat the tube material, thus forming a heating mantle which radiates heat to the crosslinkable product.

In accordance with the invention a device, in which the heating of the crosslinkable product is carried out using heat radiated from the curing tube itself, is achieved. The tube is heated to the required temperature by conducting an electrical current, for example a low voltage alternating current, through it. The radiation is very homogeneous in both the axial and radial directions of the tube, since the tube forms a uniform heating mantle and the surface temperature of the tube is lower than the surface temperature of the infrared heaters previously described. As heating occurs so evenly, the temperature of the product can be lowered, allowing the normal covering materials to be used. The length of the heating zone can also be made shorter than in other methods, and, because of the smaller heat content of the product, the cooling zone can be made shorter, or alternatively a higher production speed can be used in tubes of the same length. Because of the lower curing temperature the product is less eccentric than products manufactured at higher curing temperatures. The tube can be of smaller diameter, as no space for separate heating elements inside it is necessary. The tube diameter is therefore determined by the product, and the thickness of its walls by the pressure which may be applied. Inert gas is used to create a pressure. This method of heating can be used regardless of the shape or position of the tube.

It is possible to connect the curing tube to the voltage supply so that one single heating mantle is formed over the heating zone, or to connect the heating zone of the curing tube to voltage supplies as a series of separate tube sections so that several adjacent but independent heating mantles are obtained. In this way the temperature distribution along the tube can be selected as required since it can be quite easily preset, thus eliminating the dangers of overcuring or scorching the product. Optimisation of the heating also gives the best possible curing speed, which is higher than in the conventional steam curing system.

Provision of the tube, or corresponding tube sections, within the heating zone with inlet and outlet connections, to allow the inert gas into and out of the curing tube, eliminates the circulation of the gas through an expensive purifying system, letting it out directly at the lower end of the heating zone through a small outlet.

Cooling of the crosslinkable product can be carried out by means of either inert gas or liquid. It is advantageous, when using a cooling liquid, to fit a container equipped with an inlet and outlet for the liquid with which the tube is to be cooled, around the curing tube, below the heating zone. Cooling that section of the curing tube lying between the heating and cooling zones causes the vapourised cooling liquid to condense on the cooled section of the tube, thus preventing vapourised liquid from entering the heating zone. The streaming of the possible inert gas within the heating zone also inhibits the vapour from entering.

As was previously explained, micro-voids originate, during the curing process, from the presence of water, the penetration of the water being due to the hygroscopy of the raw materials, such as plastic or rubber, used. The phenomen takes place very quickly owing to the high temperature of the crosslinkable product when it comes in contact with the water. Water vapourised from the surface of the cooling water also enters the heating zone. The detrimental effects of vapourisation can be reduced to a certain extent by the construction of a cold trap, as previously mentioned, or a seal between the heating and cooling zones, in which part of the steam will be condensed. So that the disadvantages caused by micro-voids, a consequence of the presence of steam, are avoided, the use of a gaseous cooling medium for the cooling of the product is recommended. A gas which will have no harmful effects on the crosslinkable product must be used. Such a gas would be, for example, nitrogen, carbon dioxide, sulphur hexafluoride and certain inert gases. It is thus possible to carry out the curing of the product under completely dry conditions, that is, to heat and cool the product quite without the presence of water.

The invention is described in more detail in the following with reference to the attached drawings of which:

FIG. 1 shows a side view of one embodiment of the curing device in accordance with the invention, in which the curing tube is vertical and the cable travels through it from top to bottom.

FIG. 2 shows a schematic view of a vertical crosssection of the curing tube of the device.

Figures 3, 4:
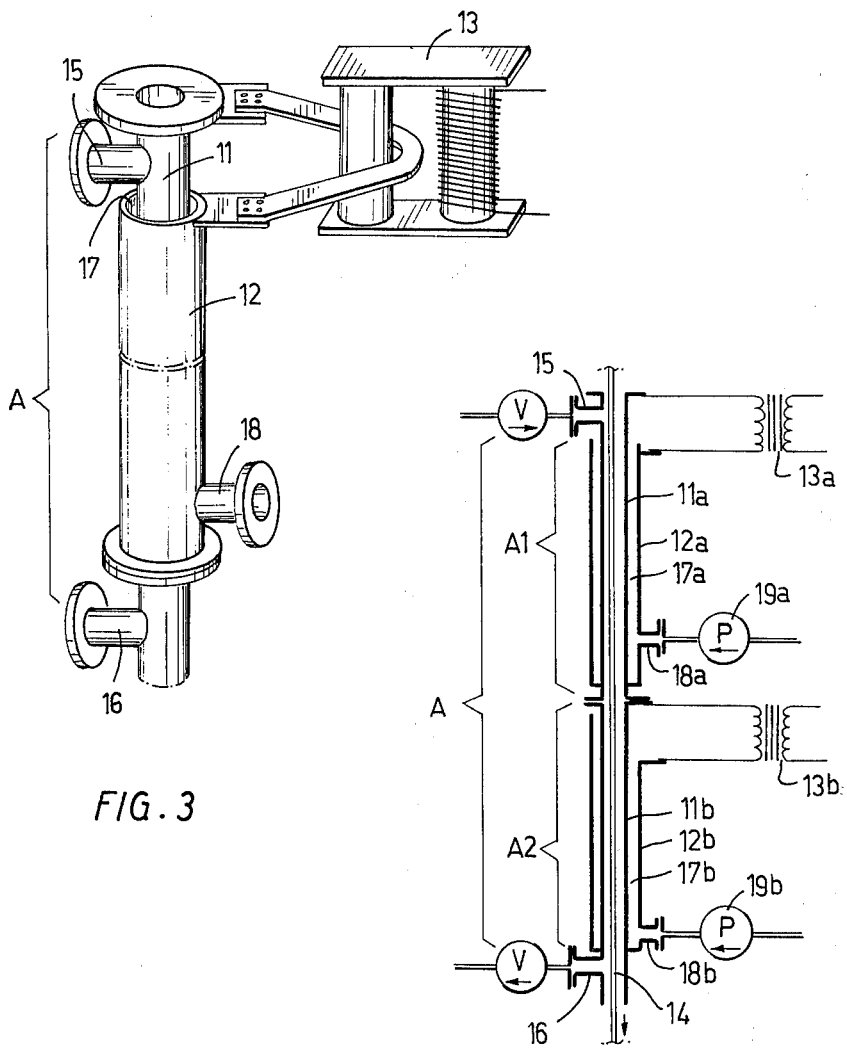
FIG. 3 shows the heating zone of the curing tube on a larger scale.
FIG. 4 shows a schematic view of an alternative embodiment of the heating zone of the curing tube.

FIG. 1 shows a vertical curing line consisting of vertical curing section 1, which is held in a vertical position by means of support 2 and extruder 3 located at the top end of the curing section, the head of said extruder being located as a continuation of the curing section. Capstans 5 and 6, for the conductor 7 which is drawn from the take-off reel 8 to the take-up reel 9, are located at the upper and lower ends of the curing section. The conductor is given a covering, at the extruder head, which is first heated to the curing temperature and is then cooled in the curing tube 1. The curing section 1 is fitted with seals 10 at its upper and lower ends, which are airtight, and through which the covered conductor 14 moves.

FIG. 2 shows the curing section 1 on a larger scale, consisting of a curing tube 11 through which the crosslinkable product is guided axially, in this case from the top end of the tube, and through the tube towards its lower end. The tube is made of pressure and temperature resistant material such as steel. While passing through the tube the product is subjected to curing heating and then to cooling. The heating zone is denoted by A and the cooling zone by B. The curing tube is surrounded over the heating zone, by a concentric mantle tube 12, which is made, for example, of copper. The upper end of this mantle tube is connected to one pole of a low voltage transformer 13, and the upper end of the curing tube is connected to the other pole of the transformer so that the mantle tube functions as a connection conductor for the heating current to the curing tube. When the electric current is connected the curing tube heats up and functions, within the heating zone, A, as a heating mantle which is uniform both around its circumference and along its axis, and from which heat radiates to the crosslinkable product.

At the upper end of the heating zone of the curing tube is an inlet connection 15, and at the lower end is an outlet 16, for example nozzles for the direction of the inert gas through the curing tube. Cooling air can be blown into the ring-shaped channel 17 inside the mantle tube 12 by means of the inlet 18 located at its lower end and blower 19.

Container 20, equipped with an inlet 21 and an outlet 22, for the circulation of cooling water around this part of the tube, is fitted round tube 11 immediately after the heating zone and before the cooling zone B. 23 is the water circulation pump, and 24 the heat exchanger. A so-called cold trap zone C is thus formed at this part of the curing tube.

The curing tube is fitted with outlet 25 at the upper end of cooling zone B, and inlet 26 at its lower end for the circulation of cooling gas or liquid through this part of the tube by means of pump 27 and through heat exchanger 28. Cooling gas or vapourised liquid travelling towards the heating zone is condensed in the cold trap section C and drains back to the cooling zone B. Container 20 thus forms a so-called cold trap. When curing materials in which the presence of water could cause harmful effects, gas is used in place of cooling water. It is thus possible to carry out the curing process quite without allowing the product to come into contact with steam or water.

Instead of the single heating mantle shown in FIG. 1, the heating zone A may consist of several adjacent heating mantles. The starting end of the curing tube is then made up of separate adjacent tube sections 11a, 11b, each of which is connected to its own transformer 13a, 13b, so that these tube sections function as heating mantles A1, A2, when the current is connected. By correct regulation of the transformers the temperature distribution of the heating zone can be set to correspond to the optimum curing process for the crosslinkable product in question.

In the following, an example of the curing of a plastic insulated cable with a device in accordance with FIGS. 1 and 4 is presented. An aluminium conductor of diameter 10.0 mm which is to be coated with plastic is drawn, by means of a capstan, through the extruder head, into the curing tube, and then, by means of another capstan, on to a take-up reel. A polyethylene coating of thickness 12 mm is extruded on to the conductor in the extruder head. The extrusion temperature is 125° C, and the heating zone A is heated by five A.C.

transformers each of which is supplying an alternating current of 2.0 – 2.5 kA to its appropriate section.

The temperature at the upper end of heating zone A of the curing tube is 350° C over a distance of 15 meters, and the temperature of the following 23 meters is 300° C. The temperature at the upper end of the cooling zone B is maintained at room temperature by blowing air into the mantle tube which surrounds it. The curing tube is filled with nitrogen at a pressure of 1.4 MPa. Both the inert gas circulating in the heating zone and the cooling gas circulating in the cooling zone are kept under pressure in order to prevent the formation of gas bubbles during curing.

In this example the product was cured at a speed of 3.5 meters/minute and the degree of curing obtained was 90%.

As shown in the cooling method in FIG. 2, the cooling gas is circulated under pressure, through inlet and outlet 25 and 26, and through curing tube 11 so that the cooling gas cools the crosslinked cable 14 and heat is removed from the cooling gas outside the tube. It is also possible to equip the cooling zone of the curing tube 11 with an outer mantle which is provided with an inlet and outlet for the circulation of gas or liquid within the mantle by means of a pump and through a heat exchanger. The curing tube is then filled with gas into and through which heat is transferred and radiated cable to the wall of the curing tube 11, this in turn being cooled by means of liquid or gas circulating inside the said mantle. In order to direct the gaseous medium into the curing tube and to keep it under pressure in the cooling zone, the cooling zone must be equipped with suitable inlet and outlet connections for the medium, which are not described here. Instead of collecting and redirecting into the tube after cooling, the cooling gas which is initially blown into the tube, it is possible, under certain circumstances, to allow the gas to pass out of the tube directly into the atmosphere, for example through outlet 25.

The figure and corresponding description are only intended to outline the concept of the invention. A device in accordance with the invention can vary considerably in details within the claims of the patent. Although the curing tube is depicted as vertical it can also be of catenary form and in any position. Although the upper end of the curing tube 11 is shown, in FIG. 2, to be connected directly to one pole of the voltage supply and the lower end, through mantle tube 12, to the other pole of the voltage supply, it is clear that the lower end of the curing tube can also be connected by some other intermediate part or busbar to the voltage supply.

We claim:

1. A device for the continuous curing of longitudinally extended crosslinkable products, such as cables, consisting of a curing tube through which the product undergoing crosslinking is drawn, and which comprises a heating zone, a cooling zone, the necessary equipment for heating the product in the heating zone up to the crosslinking temperature and the equipment for cooling the crosslinked product in the cooling zone, characterised in that wherein the curing tube itself is connected to at least one voltage supply so that the walls of the curing tube function as an electrical resistance in order to heat the tube material, thus forming a heating mantle which radiates heat to the crosslinkable product.

2. A device in accordance with claim 1, wherein the curing tube is connected to a voltage supply at the opposite ends of the heating zone in order to form a uniform heating mantle extending over the whole heating zone.

3. A device in accordance with claim 1, wherein the curing tube consists of axially adjacent tube sections in the heating zone, each of which is separately connected to its own voltage supply in order to form several independent adjacent heating mantles.

4. A device in accordance with claims 2, wherein the curing tube or the corresponding tube sections are surrounded by an outer concentric mantle tube or the corresponding mantle tubes, within the heating zone, in order to form a ring-shaped channel for the cooling air.

5. A device in accordance with claim 4, wherein the curing tube or the corresponding tube sections are connected to a voltage supply by means of a mantle tube which forms the coolant air channel.

6. A device in accordance with claim 1, wherein the curing tube or the corresponding tube sections within the heating zone are equipped with inlet and outlet connections in order to direct inert gas in and out of the curing tube.

7. A device in accordance with claim 1, wherein a container is located after the heating zone and surrounding the curing tube, which is equipped with inlet and outlet connections for the cooling liquid employed for the curing tube.

* * * * *